United States Patent [19]

Salzsauler et al.

[11] Patent Number: 5,531,393
[45] Date of Patent: Jul. 2, 1996

[54] STRETCH FILM

[76] Inventors: Donald J. Salzsauler; Richard J. Salzsauler, both of Box 25, R.R. 2, Georgetown, Ontario, Canada, L7G 4T1

[21] Appl. No.: 253,487

[22] Filed: Jun. 3, 1994

Related U.S. Application Data

[63] Continuation of Ser. No. 885,742, May 19, 1992, abandoned.

[51] Int. Cl.$^6$ .................. B65H 18/28; B32B 3/04; B32B 3/00
[52] U.S. Cl. ................. 242/160.400; 428/121; 428/156
[58] Field of Search .................. 242/160.1, 160.4; 428/121, 126, 156; 206/389

[56] References Cited

U.S. PATENT DOCUMENTS

| | | | |
|---|---|---|---|
| 3,086,648 | 4/1963 | Corbett | 242/1 |
| 3,125,218 | 3/1964 | Floyd | 242/160.4 |
| 3,224,574 | 6/1964 | McConnell et al. | 242/1 |
| 3,434,591 | 3/1969 | Hanscom | 242/160.4 |
| 3,737,030 | 6/1973 | Stewart | 242/160.1 |
| 4,034,853 | 7/1977 | Smith | 242/160.4 |
| 4,044,501 | 8/1977 | Frydryk | 428/121 |
| 4,166,589 | 9/1979 | Hoover et al. | 242/55 |
| 4,950,511 | 8/1990 | Francis | 428/121 |
| 5,170,957 | 12/1992 | Carpenter | 242/160.4 |
| 5,205,650 | 4/1993 | Rasmussen | 428/156 |

*Primary Examiner*—Daniel P. Stodola
*Assistant Examiner*—Eileen A. Donn
*Attorney, Agent, or Firm*—Eugene J. A. Gierczak

[57] ABSTRACT

A roll of stretched plastic film having an embossed surface for trapping air so as to facilitate unwinding of the roll of stretched film, stretched between 50 and 300 percent of the original length of the film, for wrapping pallet loads and particularly includes a folded edge for strengthening the edge, which folded edge is applied in a manner so as to minimize piling up of the rolled folded edge.

12 Claims, 8 Drawing Sheets

STRETCH FILM

This is a continuation of application Ser. No. 07/885,742, filed May 19, 1992, now abandoned.

FIELD OF INVENTION

This invention relates to a roll of stretched film having an embossed or impressed surface for trapping air so as to facilitate unwinding of the roll of stretched film for wrapping pallet loads and more particularly relates to a roll of stretched embossed film having folded edges applied in a manner to minimize piling up of the folded edges. Furthermore, the invention relates to the rollers, apparatus and method for producing a roll of stretched embossed film to be utilized in wrapping pallet loads.

BACKGROUND OF THE INVENTION

Various methods and apparatus for packaging and shipping goods have been proposed and implemented in the past. For example, boxes may be stacked onto a pallet and a web of plastic film may be rotated about the pallet load. Such plastic film may be stretched as the plastic film rotates about the pallet load. Alternately, the plastic film may be pre-stretched between rollers prior to being wrapped around the pallet load.

For example, U.S. Pat. No. 5,040,356 relates to a method for stretching plastic which involves a stretching device incorporated into a stretch wrap machine for producing stretched plastic for wrapping a load. Means are provided for stretching a sheet of stretchable plastic material at an angle across one or more stretching devices. The method comprises stretching the plastic over a plurality of generatrices in substantially parallel arrangement, moving the generatrices in an eccentric path about a central axis and moving the generatrices in the axial directions in staggered coordination.

Moreover, U.S. Pat. No. 5,016,427 provides a process for feeding packaging film to a wrapping machine. The film is fed to an upstream and downstream main roller defining between them a passage. As the film is fed towards the rollers, upstream and downstream guide rollers are located at positions nearest the entry and exit sides of the passage.

Hand-held devices for dispensing plastic film for wrapping stacked items have also been used in the past as described in U.S. Pat. No. 4,166,589. Such hand actuated devices include braking mechanisms to stretch the film as it winds around a stack.

Furthermore, U.S. Pat. No. 5,003,752 relates to a plastic film which is stretched breadthwise and longitudinally just before it is wound around a load for wrapping. Stretching of the film is performed by passing the film between stretching rolls each having alternate peripheral ridges and grooves and arranging such that the ridges on each roll mesh with the grooves on the other roll.

Finally, U.S. Pat. No. 4,499,706 teaches a double layer thermal plastic film which is used in pass through stretch wrapping of goods. The double layer improves the tear resistance and puncture resistance of the film.

Moreover, various attempts have heretofore been made to pre-stretch a web of plastic material and rolling said stretched or pre-stretched film around a core for later use. Such stretched rolls of film could be advantageously used by either manually applying the stretched film in a manner disclosed in U.S. Pat. No. 4,166,589 or by applying same by automated means such as a machine or the like. The use of a roll of stretched film could be cost effectively utilized in a pallet wrapping machine by obviating the need for expensive pre-stretched carriages such as that disclosed in U.S. Pat. No. 4,628,667.

However, previous attempts to produce rolls of stretched plastic materials which may later be used to wrap pallet loads including those described above have found limited utility for a number of reasons including:

(a) the film which is stretched has a tendency to retain a "memory" which tends to cause the stretched film to contract into its original length as the film recovers. Accordingly, film which has been stretched and then rolled tends to "weld" together making it difficult to unwrap stretched rolled film without ripping same;

(b) furthermore, stretched film which has been rolled tends to tear easily since such film is under tension and may be easily torn by nicking or stressing the edges of the rolled film.

It is an object of this invention to provide an improved roll of stretched film which is easier to unwind when required to wrap pallet loads and which has strengthened tear characteristics than that presently available by the prior art.

It is also an object of this invention to provide apparatus and a method for producing stretched film which is simple to construct.

SUMMARY OF THE INVENTION

It is an object of this invention to provide a roll of prestretched plastic film prestretched along the length thereof and presenting two opposite side edges folded along the lateral direction to said length for strengthening said edges of said rolled film, said film stretched by an amount greater than applied in ordinary tensioning of mils of plastic film.

It is a further object of this invention to provide a roll of prestretched plastic film for wrapping pallet loads, said film prestretched along the length thereof and rolled so as to present two opposite side edges along the lateral direction to said length where said opposite side edges are thicker than the remainder of said prestretched film, said film stretched by an amount greater than applied in ordinary tensioning of rolls of plastic film.

It is yet another object of this invention to provide a roll of prestretched plastic film for wrapping pallet loads, said roll of film having air trapped between successive wraps of said roll to facilitate unwinding of said roll, where said film is prestretched by an amount selected to permit contraction of said film when unwound to wrap said pallet loads.

It is yet another object of this invention to provide a roll of prestretched plastic film for wrapping pallet loads, said film prestretched along the length thereof and presenting two opposite side edges folded along the lateral direction to said length for strengthening said edges of said rolled film, said film prestretched by an amount selected to increase the strength characteristics of said plastic film due to stretching.

Yet another aspect of this invention resides in a roll of stretched plastic film having two opposite side edges thereof wherein said edges are folded and said plastic film has an impressed textured surface for trapping air so as to facilitate unwinding of said roll of stretched film for wrapping pallet loads, and wherein said film has been mounted onto a core so as to minimize piling up of said folded edges.

Another aspect of this invention resides in a roller for stretching and embossing a web of stretchable film, said roller including; a shaft having an axis of rotation; and a textured cylindrical surface associated with said shaft and rotatable about said axis for stretching and embossing said texture onto said web as said web rotates about said textured cylindrical surface.

Furthermore, another aspect of this invention resides in apparatus for stretching and rolling a web of stretchable film, comprising; structure for receiving said web of stretchable film; textured rollers frictionally rotatably engageable with said web of stretchable film for stretching said film and embossing said texture from said textured rollers onto said film; structure for rolling said stretched embossed film so as to trap air in said embossed rolled film; structure for rotatably driving said textured rollers and said rolling structure.

Moreover, another aspect of this invention resides in apparatus for producing a roll of stretched film for wrapping pallet loads, said apparatus including: structure for receiving a roll of unstretched plastic film having two opposite side edges thereof; structure for folding said edges so as to strengthen said edges of said plastic film; first and second textured rollers frictionally rotatably engageable with said roll of unstretched film for stretching and embossing said film; a rotatable core rotatably receiving said stretched embossed film to thereby trap air in said stretched embossed rolled film; structure for rotatably driving said textured rollers and said core; structure for oscillating said core between two limits as said core rotatably receives said stretched embossed film so as to minimize piling up of said folded edges of said rolled film.

Another aspect of this invention relates to a method for producing a roll of stretched plastic film comprising the steps of: feeding a web of film to textured rollers; stretching and embossing said fed web by said textured rollers; and rolling said stretched embossed film onto a core so as to trap air in said embossed rolled film.

The last embodiment of this invention relates to a method of producing a roll of stretched film for wrapping pallet loads, said method including the steps of: feeding a web of stretchable film having two opposite side edges thereof; folding said edges of said fed web of stretchable film so as to strengthen said edges; then stretching and embossing said folded web by first and second textured rollers; rolling said stretched embossed film onto a core so as to trap air in said stretched embossed rolled film; oscillating said core between two limits when rolling said stretched embossed film onto said core so as to minimize piling up of said folded edges of said rolled film.

DRAWINGS OF THE INVENTION

These and other objects and features are illustrated and described in the following specification to be read in conjunction with the sheets of drawings in which.

DESCRIPTION OF THE INVENTION

In the figures like numerals represent like elements.

Although the preferred web material utilized herein comprises of stretchable plastic film and particularly linear low density polyethylene (LLD) other materials may be utilized.

It is known that most plastic films when stretched above their yield point gain significantly in ultimate strength. Such stretched plastic film will have a "memory". For example, a stretched film having a 10% memory will shrink 10% of its stretched length. Such memory assists in the holding of palletized articles wrapped with stretched film as the memory or tendency to shrink will assist in holding the articles together under compression.

Figure 1:
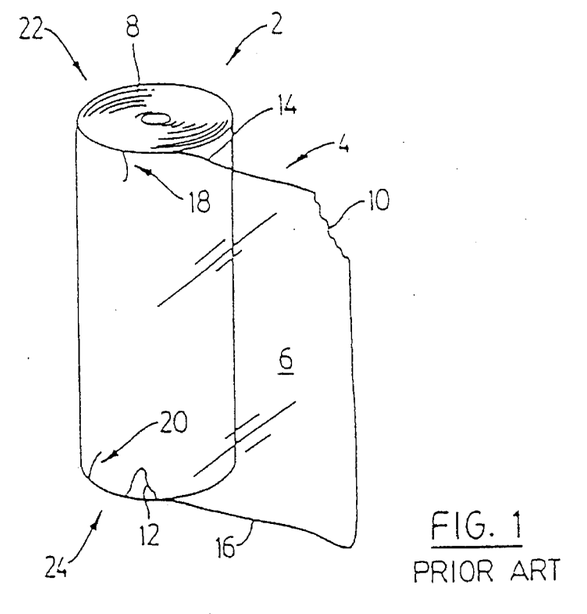
FIG. 1 illustrates the prior art roll of stretched film.

However, the memory characteristics of stretched film which has been rolled will cause the surface 6 of successive wraps of the stretchable material 4 to "weld" together making it difficult to unwrap the stretchable material 4 from the roll 2 of stretched film.

FIG. 1 illustrates a roll 2 of web material 4 which has been stretched and then rolled in accordance with prior art teachings.

Prior art rolls 2 of stretched film 4 tend to present torn portions 10 or 12 when unwrapped. Moreover, rolls 2 of stretched film 4 exhibited by the prior art present a web of material 4 which is under tensile stress and accordingly the opposite side edges 14 and 16 may be easily torn as illustrated by 18 and 20 particularly when the ends 22 and 24 of roll 2 accidentally hit or contact another surface.

Figure 2:
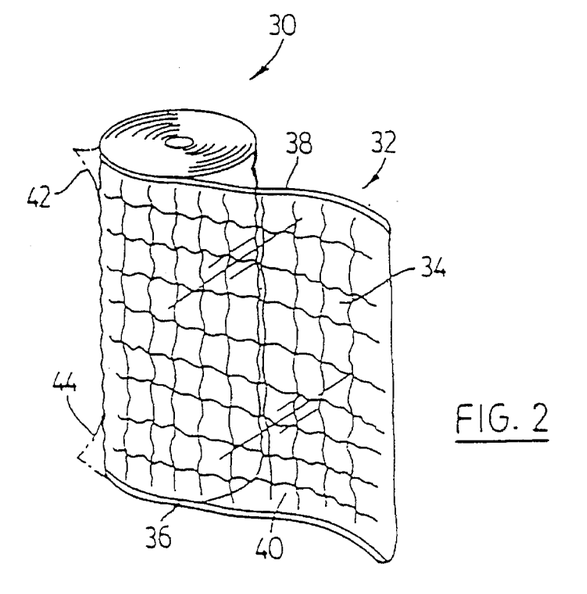
FIG. 2 illustrates a roll of stretched embossed film in accordance with the invention described herein.

FIG. 2 illustrates a roll 30 of stretched film 32 having an embossed surface 34 in accordance with the invention to be described herein.

The roll 30 of stretched film 32 has two opposite ends 34 and 36 defined by rolled folded edges 38 and 40. The folded edges 38 and 40 strengthen the edges of the rolled film 30 so as to strengthen the tear characteristics of the edges 38 and 40 of the rolled film 30. The folded edges 38 and 40 inhibit the formation of tears 18 and 20 which are characteristic of prior art rolls of stretched film as illustrated in FIG. 1.

Moreover, the roll 30 of stretched film 32 is rolled in a manner so as to minimize the piling up of the folded edges 38 and 40 which is illustrated by phantom lines and numerals 42 and 44 of FIG. 2. More particularly, the web of film 32 is oscillated between two limits 46 and 48 in a manner to be more fully described herein.

Figures 3A, 3B:
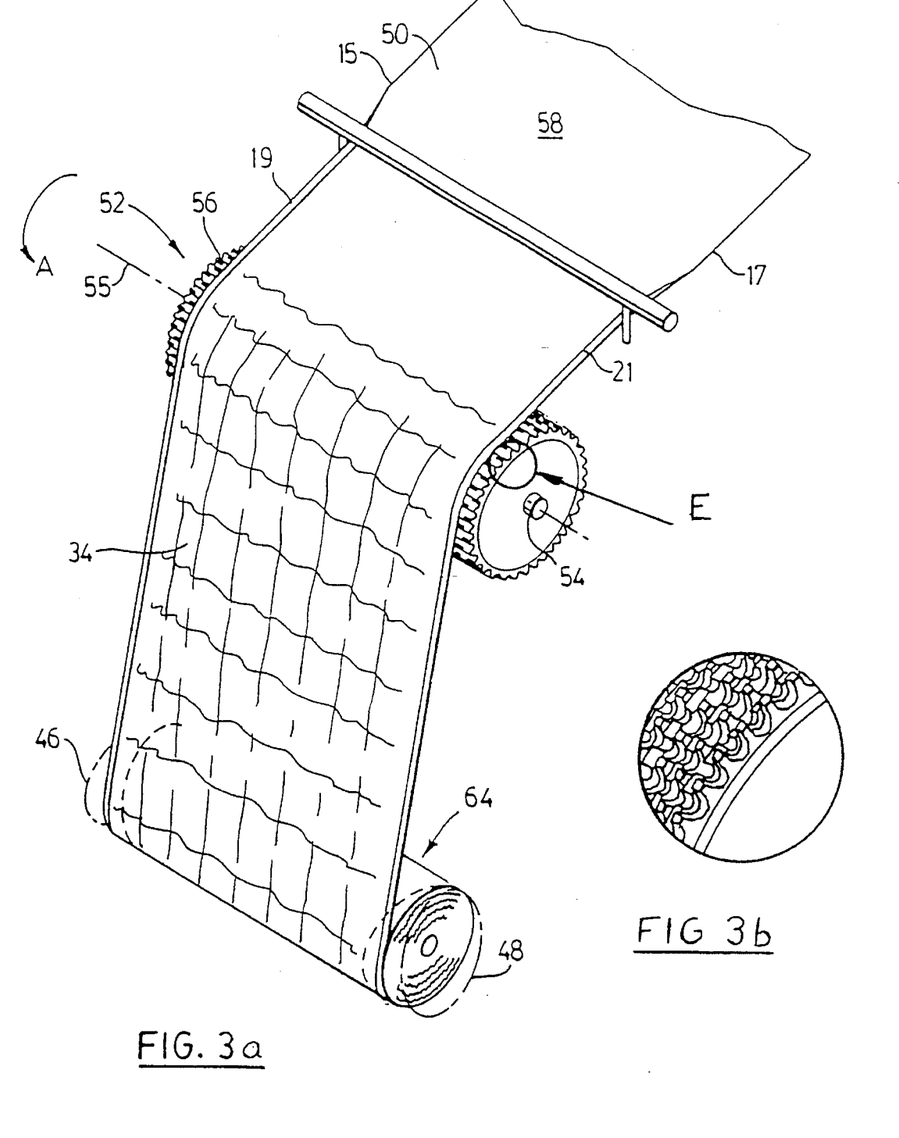
FIG. 3 is a perspective view of the embossing roller means.
Figure 4:
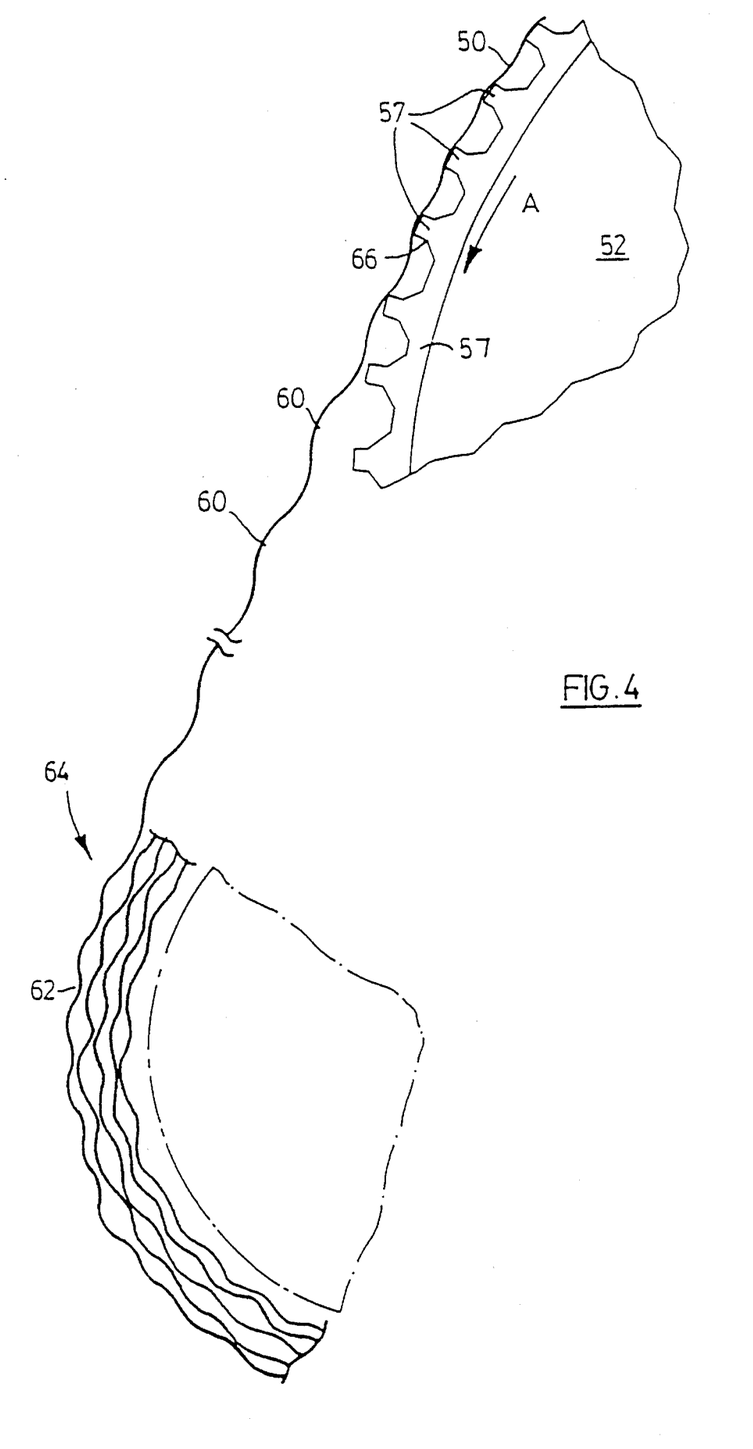
FIG. 4 is a partial side view of the textured surface of the textured roller.

FIGS. 3 and 4 are illustrative of the invention described herein. More particularly, a web of stretchable plastic material or film 50 which may be unrolled from a roll of unstretched plastic film (not shown) is fed towards textured roller means 52. Textured roller means 52 includes a rotatable shaft 54 which is rotatable about an axis 55 in the direction of arrow A. Textured roller means 52 includes a textured cylindrical surface 56 which is associated with the shaft 54 and also rotatable about axis 55.

The enlarged view of FIG. 3 as well as FIG. 4 best illustrate the texture of the textured roller means 52.

FIG. 4 best illustrates the stretching and embossing imparted or impressed by textured roller means 52. In particular, the web of stretchable material 50 is frictionally engaged by the textured surface 56 of textured roller means 52 so as to stretch and emboss the surface 58 of stretchable film 50.

In the preferred embodiment described herein, the web of plastic film 50 is stretched in the direction of travel by approximately 200%. In other words, one foot of unstretched plastic film is stretched to approximately three feet of stretched plastic film by textured roller means 52.

The textured roller means 52 has a textured rubber surface 57 which presents a patterned contour designed to impress a pattern onto the film 50. In particular, the embossed surface 56 of textured roller means 52 presents a predetermined pattern for embossing the surface of stretchable film 58 as it is stretched about textured roller means 52. In particular, the textured surface 57 of textured roller means 52 embosses or raises portions of surface 58 so as to present a series of impressed pockets 60 which trap air 62 when the stretched embossed film 50 is wrapped around so as to present roll 64. The textured surface 56 presents a series of raised portions 57 which raise portions of film 50. More particularly, the textured surface 56 presents a roughened contour 66 which impresses or embosses a textured surface onto the web of stretchable material 50 so as to trap a cushion of air between adjacent wraps of the rolled film and thereby facilitate later unwinding of the roll 64 of stretched embossed film for wrapping pallet loads.

The textured surface 56 illustrated in the drawings of the preferred embodiment is made by helically wrapping a rubberized conveyor belt having the texture or contour illustrated about the cylindrical surface of the roller and adhesively securing same to the roller. The conveyor belt presents the textured contour as illustrated in the drawings. Thereafter, the textured surface 56 may be smoothed by inserting same into a lathe so as to produce a textured surface having a common outside diameter.

As referred to above, the roll 64 of stretched embossed film 50 traps air 62 in the pockets impressed or embossed by textured roller means 52 so as to present a cushion of air which minimizes or inhibits the welding characteristics of wraps of rolled stretched film thereby facilitating the later unwinding of said stretched embossed film for wrapping pallet loads.

Moreover, the web of stretchable material 50 presents opposite side edges 15 which are folded in a manner to be described herein so as to present folded edges 19 and 21 respectively. Thereafter the textured roller means 52 emboss the surface 58 of stretchable material 50.

The textured pattern 34 which has been impressed or embossed by textured roller means 52 and the folded edges 19 and 21 trap air between successive wraps of stretched film 64 so as to facilitate later unwinding of same.

The rolls of stretched embossed film 64 which have been stretched approximately 200% are significantly lighter in weight than the comparable length of unstretched plastic film. Moreover, the stretched roll of embossed film 64 exhibits increased strength characteristics due to stretching as well as exhibiting increased tear characteristics along the folded edges 19 and 21. Alternatively, the roll 64 could be stationary and the film could be oscillated between two positions.

Moreover, as the stretched embossed film is wound into roll 64, the roll 64 is oscillated between two positions 46 and 48 so as to minimize piling up of folded edges 19 and 21.

Figure 5:
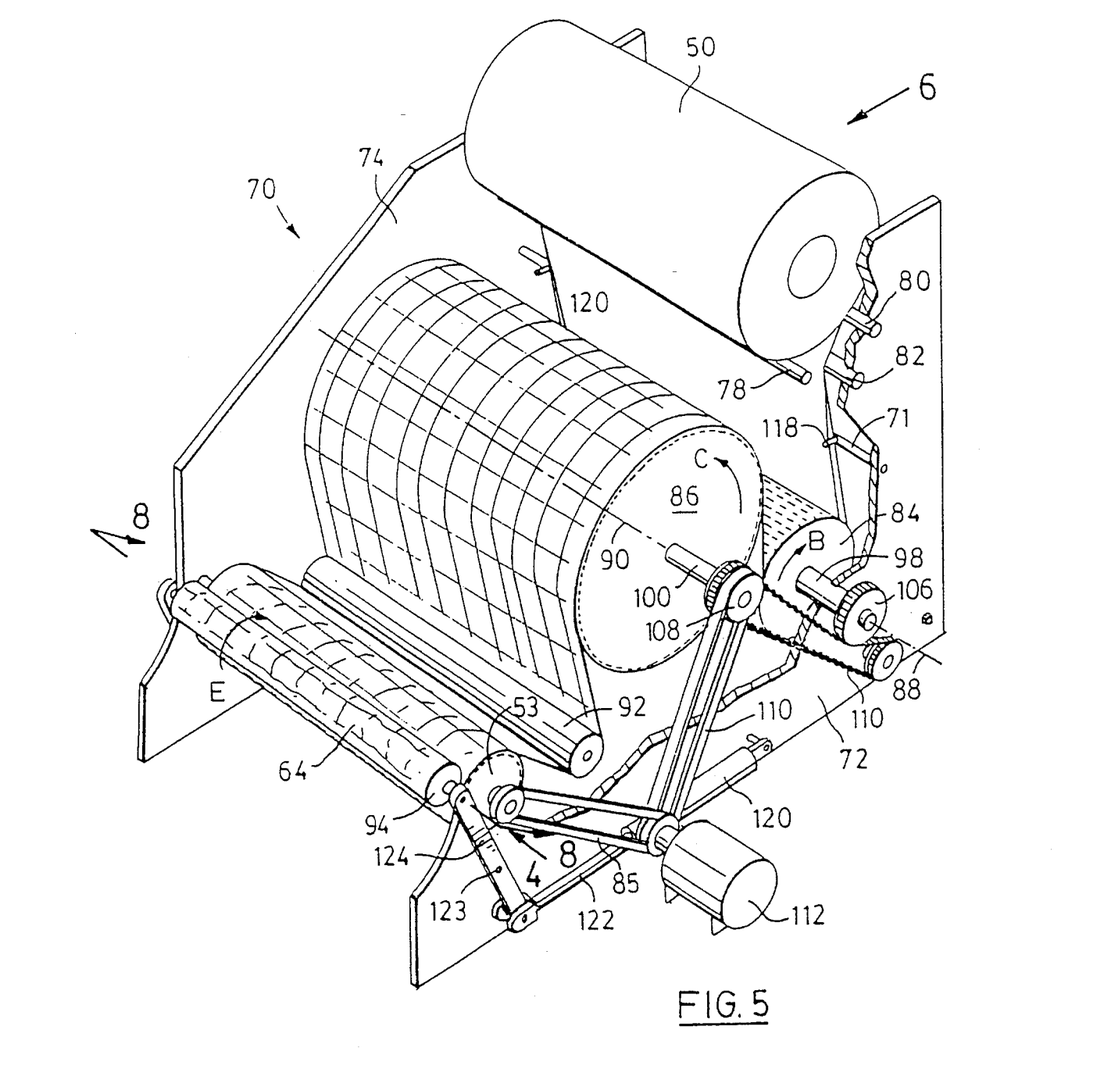
FIG. 5 is a perspective view of apparatus utilized to produce the stretched embossed roll of plastic film.

FIG. 5 is a perspective view of apparatus 70 for producing a roll 64 of stretched embossed film for wrapping pallet loads.

In particular, apparatus 70 includes two spaced side plates 72 and 74 which are held in spaced relationship by rods 76. Apparatus 70 includes idler rollers 78 and 80 which are adapted to receive a roll of stretchable film. The roll of stretchable film 50 is adapted to frictionally engage idler 82 for frictional contact with the textured roller means 52. In particular, the texture roller means 52 comprise a first textured roller 84 and a second textured roller 86. Although the remaining paragraphs describe the apparatus in relation to a first textured roller 84 and a second textured roller 86, the requirement of the first textured roller 84 is optional and the apparatus described herein may be utilized with only one textured roller 86 with first textured roller 84 being optional. In such case the first roller 84 could be comprised of a normal prior art roller with the stretching occurring between rollers 86 and 84.

In the embodiment illustrated in FIG. 5, first textured roller 84 is adapted for rotation about a first shaft 98 having an axis of rotation 88 in the direction of arrow B while second textured roller 86 is adapted for rotation about a second shaft 100 having an axis of rotation 90 in the direction of arrow C. In particular, first textured roller 84 is rotated in a clockwise direction about axis 88 while second textured roller 86 is rotated in a counterclockwise direction about axis 90 as illustrated in FIG. 5.

The diameter of first textured roller 84 and second textured roller 86 and the relative revolutions per minute of each is selected so as to cause the web of plastic film 50 to be stretched between first textured roller 84 and second textured roller 86 by a predetermined amount. The relative spacing between first textured roller 84 and second textured roller 86 is selected so as to minimize the "neck down" of the film as it is stretched between said first and second textured rollers 84 and 86. For example, a 20" width of roll of unstretched plastic film will contract to a width of approximately 18" when stretched between first textured roller 84 and second textured roller 86 by controlling spacing 92 between said first and second textured rollers 84 and 86 between 1" and 2".

The textured rollers 84 and 86 emboss or impress a textured surface from the textured rollers 84 and 86 onto the surface 58 of stretchable material 50 in a manner as described above. The stretched embossed film 50 is then wound around idler roller 92 and then rotatably received around a core 94 so as to produce a roll 64 of stretched embossed textured film.

Figure 11:
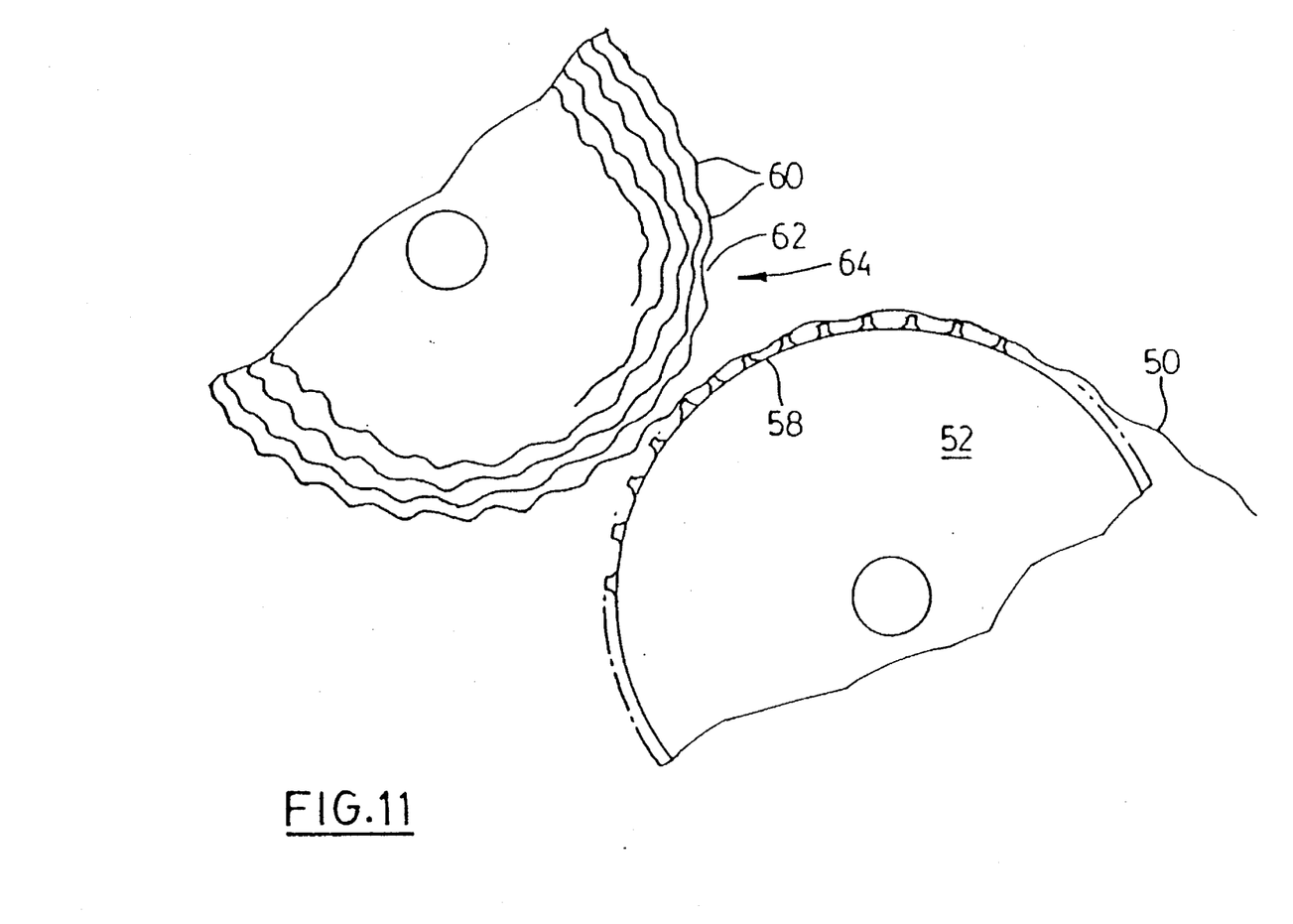
FIG. 11 is a view of the take up roll and core.

A roller 53 is used to frictionally rotate core 94 so as to roll or wind the stretched embossed plastic about core 94 and produce the roll 64. FIGS. 5 and 11 illustrate that roller 53 is driven by means of motor 112 through a drive mechanism comprising of pulley 83 and belt 85. The roller 53 contacts the core 94 as shown in FIG. 11 and winds or rolls the stretched embossed film onto core 64.

Figure 6:
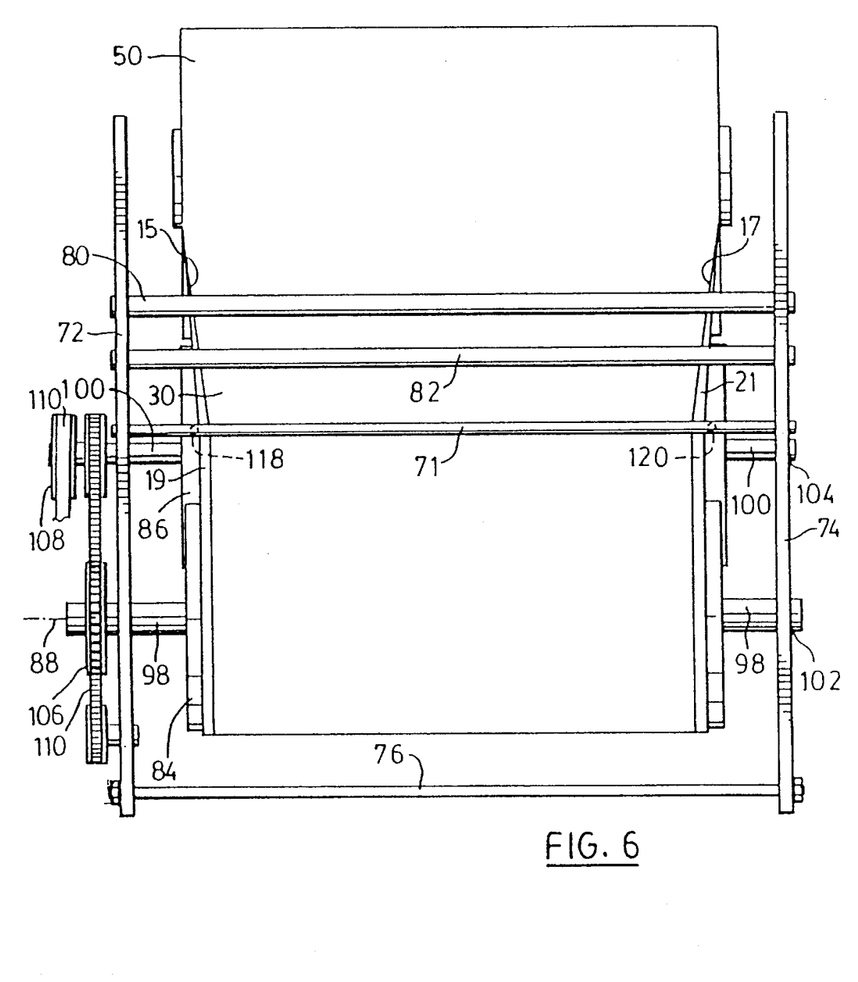
FIG. 6 is a rear side elevational view of the apparatus illustrated in FIG. 5.
Figure 7A:
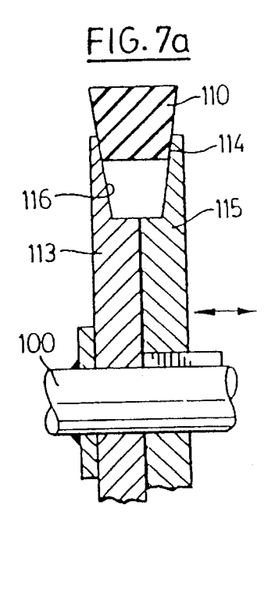
FIG. 7a and 7b are side elevational views of the pulley.
Figure 7B:
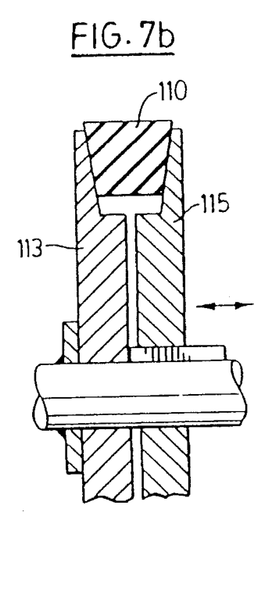

First textured roller 84 and second textured roller 86 present first shaft 98 and second shaft 100 respectively which extend through apertures 102 and 104 respectively located in side plates 72 and 74 as shown in FIG. 6. First shaft 98 and second shaft 100 include first pulley means 106 and second pulley means 108 which are connected together by means of an endless belt 110 which is engageable with a motor 112 for relative rotational movement of said first textured roller 84 and second textured roller 86. Although the preferred embodiment illustrates the use of pulleys and an endless belt, any number of well known means such as gears or the like may also be utilized in accordance with this invention. Moreover, the endless belt 110 utilized in the preferred embodiment has a tapered end 114 as illustrated in FIG. 7 which may be adjustably driven further into the tapered slot 116 of pulley 106 in a manner well known in the art so as to adjust or fine tune the relative speeds and hence the degree of stretching of the web of plastic film 50 to a desired level. For example, by adjusting the pulley, plates 113 and 115 close together as shown in FIG. 7a, this causes the endless belt to ride higher up in the slot 116. Alternatively, one may adjust the pulley plates 113 and 115 further apart as in FIG. 7B so as to cause the belt to ride lower onto the pulley. Accordingly, the relative speed and hence the amount of stretching between the rollers 84 and 86 may be controlled.

Side plates 72 and 74 present a rod 71 which include folding finger means 118 and 120 projecting inwardly from the side plates 72 and 74 respectively so as to cause the edges 15 and 17 respectively of the web of plastic film 50 to be folded thereby presenting folding side edges 19 and 21 prior to stretching and embossing of the surface 58 of web 50. The fingers 118 and 120 may be adjusted along rod 71 to control the amount of folding.

Apparatus 70 also includes an air pressure cylinder 120 having an arm 122 activated by air pressure causing arm 124 to pivot about pivot 123 inwardly in the direction of arrow E. This causes the core 94 to bear against roll 53 to regulate the proper tension and rolling of stretched embossed film about core 94.

Moreover, pulley 83 also includes the pulley adjusting mechanism shown in FIGS. 7a and 7b so that the relative speed of roller 53 and be adjusted. For example, by driving the belt 85 deeper into the pulley 83 the speed of roller 53 increases thereby causing the stretched embossed plastic film to be wound tighter around core 94 thereby presenting a roll 64 which is smaller in diameter than if the belt rides higher in the pulley as shown in FIG. 7a. Accordingly, one may produce a roll 64 which has a larger or smaller diameter for a given length of stretched embossed film depending on the speed of the rotation of roll 53 (i.e. by adjusting the pulley mechanism similar to FIGS. 7a and 7b). In other words, the amount of air that is trapped in the layer of wrapped film may be controlled.

Figure 8:
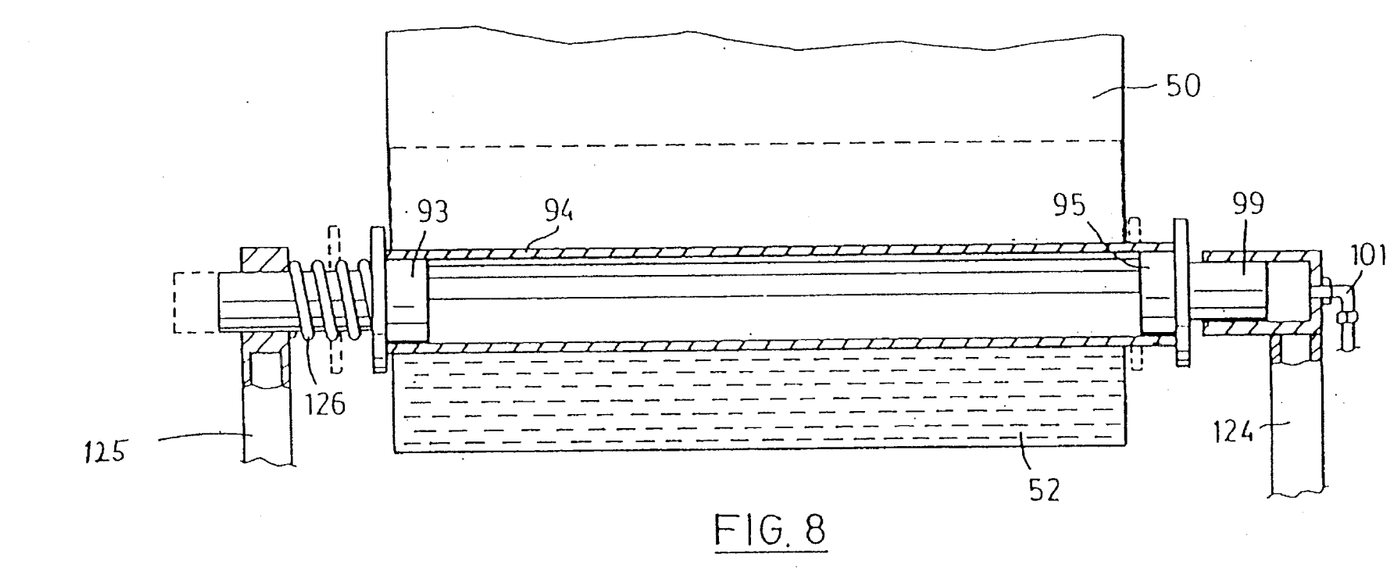
FIG. 8 is a section view through the core.

Moreover, a shown in FIG. 8, a spring 126 is associated with hollow core 94 whereby the core 94 is oscillated between two limit positions 46 and 48 by oscillating means so as to cause the folded edges 19 and 21 to wander in a helical path thereby minimizing the piling up of the edges 19 and 21 as the stretched embossed film 50 is rolled about core 94. The spring 126 is utilized to assist in the oscillating motion.

The oscillating means is more particularly described in FIG. 8 which consists of two arms 124 and 125. The arm 125 includes a shaft presenting a spring 126 with cap 93. The arm 124 also includes a cylinder which is adapted to receive cap 95 having a piston 98 reciprocating between two limit positions of air cylinder having a chamber communicating with air pressure conduit pipe 101. In particular, air under pressure is cyclically repetitively inserted through pipe 101 so as to enter the chamber to bear against piston 99 and thereby move cap 95. The caps 95 and 93 are inserted into the opposite hollow ends of core 94. As the cap 95 is reciprocally activated between the two limit positions illustrated by numerals 46 and 48 of FIG. 3, the stretched embossed film 50 is wrapped around the core 94 so as to minimizing piling up as previously described.

Although the invention is described in relation to the core 94 reciprocating between two limit positions, another embodiment of the invention would include keeping the core 94 stationary and moving the stretched embossed plastic 50 between two limit positions.

The pulley 102 is also engageable with the shaft 93 in a manner so as to take up or roll the stretched embossed plastic film.

The method of producing a roll of stretched film for wrapping pallet loads as described herein includes the steps of; feeding a web of stretchable film 50 which has two opposite side edges 15 and 17; folding the edges 15 and 17 by means of folding fingers 118 and 120 so as to present folded edges 19 and 21 respectively to strengthen the edges 19 and 21; then stretching and embossing the folded web by first and second textured rollers 84 and 86 as described above; then rolling said stretched embossed film onto a core 94 so as to trap air in the embossed pockets 64 and folded edges 19 and 21; oscillating the core 94 between two limits 46 and 48 so as to minimize piling up of the folded edges of the rolled film 64.

Figure 9:
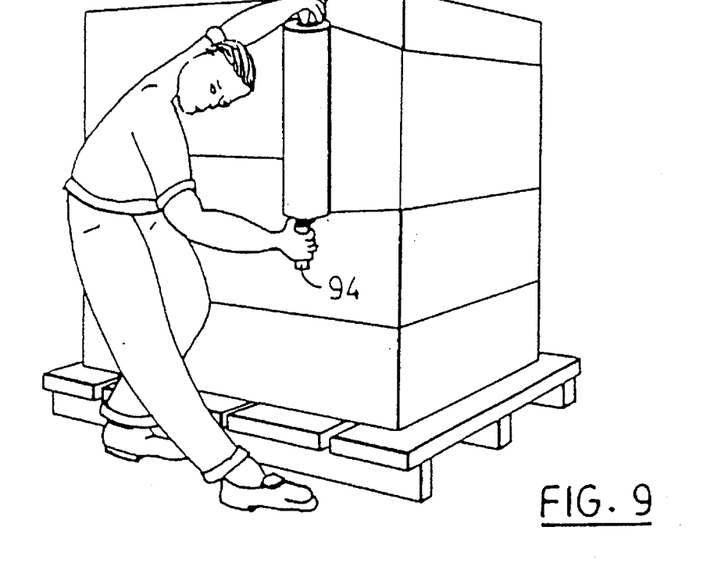
FIG. 9 is a view of a manual application of the stretched embossed film.

The roll 30 of stretched embossed film 32 as illustrated in FIG. 2 may then be applied by hand as illustrated in FIG. 9. In the embodiment illustrated in FIG. 9, the finished product consists of the wrapped stretched embossed film wrapped around core 94 which can be removed from the apparatus shown in FIG. 5.

The core may be comprised of a hollow core made of a variety of materials including paper. In the preferred embodiment the core is made of paper and coated with silicone. Accordingly when the roll 64 wrapped around core 94 is applied by hand the user may easily apply same since the core will easily rotate in the user's hand due to the silicone which reduces frictional drag. Moreover, since the film has been stretched and embossed and rolled about core 94, the film is easily removed from core 94 without sticking and the roll 64 is lighter for the same length of wrap due to the stretching of same.

Figure 10:
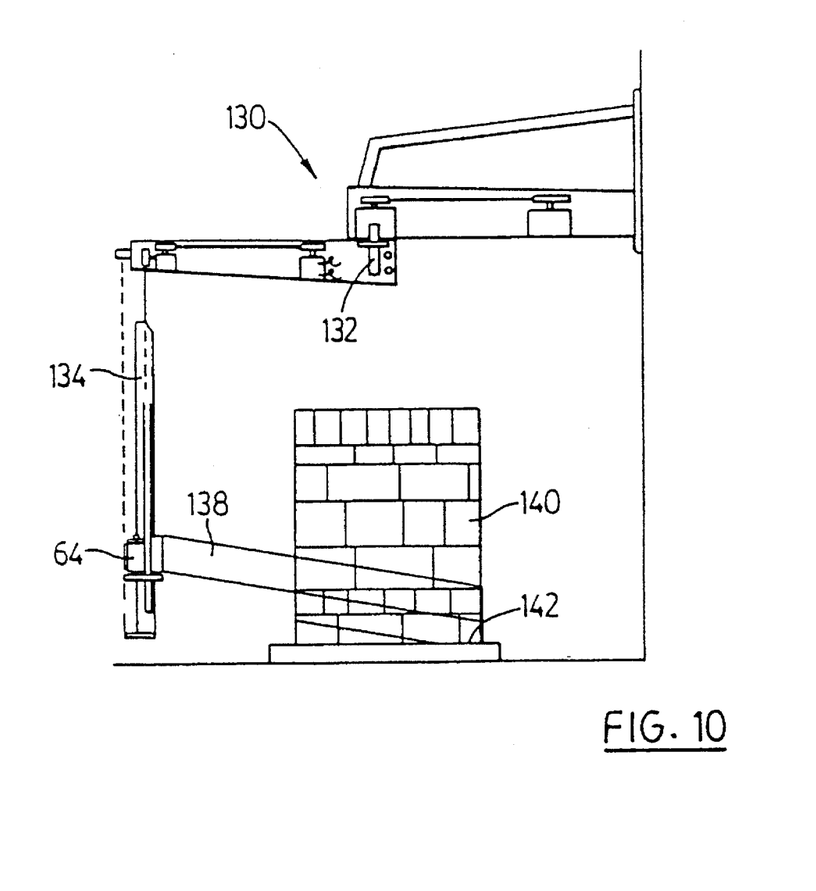
FIG. 10 is a side elevational view of automated means utilizing the stretched embossed film described herein.

Alternatively, the roll of stretched embossed film 64 may be applied by automated means as shown in FIG. 9. More particularly, the automated means illustrated in FIG. 10 shows a pallet wrapping machine 130 which is adapted to rotate about axis 132. The pallet wrapping machine includes a depending leg 134 having a dispensing apparatus 136 which may adapted to receive the stretched embossed roll 64 for dispensing stretched embossed film 138 about a load 140 mounted on a pallet 142.

Efficient and less complicated dispensing means 136 can be utilized in association with the roll of stretched embossed film 64.

Although the preferred embodiment as well as the operation and use of this invention has been specifically described in relation to the drawings, it should be understood that variations in the preferred embodiment could be easily achieved by a skilled man in the trade without departing from the spirit of the invention. Accordingly the invention should not be understood as being limited to the exact form revealed in the drawings.

The embodiments of the invention in which an exclusive property or privilege is claimed are defined as follows:

1. A roll of stretched plastic film for wrapping a pallet load, said film having two opposite outermost side edges and an unstretched original length, said film being stretched along the length thereof between 50% and 300% of the original length, the two opposite outermost side edges being folded over along the lateral direction to the length for strengthening the outermost edges of the film, the stretched film then being rolled.

2. A roll of stretched plastic film as claimed in claim 1 wherein said plastic film has an impressed textured surface to trap air so as to facilitate unwinding of said roll of stretched film.

3. A roll of stretched plastic film as claimed in claim 1 wherein said film presents a variable gauge thickness to trap air in said rolled film so as to facilitate the unwinding of said roll of stretched film.

4. A roll of stretched plastic film as claimed in claim 1, wherein said stretched film is rolled around a core.

5. A roll of stretched plastic film as claimed in claim 4 wherein said core is coated with silicone.

6. A roll of stretched plastic film as claimed in claim 1, wherein said stretched film has increased strength characteristics due to stretching.

7. A roll of stretched plastic film as claimed in claim 1 wherein said plastic film is stretched to impart a memory to said stretched film to permit contraction of said stretched film when unwound to wrap said pallet load.

8. A roll of stretched plastic film as claimed in claim 7 wherein said film is stretched approximately 200 percent.

9. A roll of stretched plastic film for wrapping a pallet load, said film having two opposite outermost side edges and an unstretched original length, said film being stretched along the length thereof between 50% to 300% of the original length, the two opposite outermost side edges being thicker than the remainder of said stretched film for strengthening the outermost edges of the film, the stretched film then being rolled.

10. A roll of stretched plastic film as claimed in claim 9 wherein said plastic film has an impressed textured surface to trap air so as to facilitate unwinding of said roll of stretched film.

11. A roll of stretched plastic film as claimed in claim 10 wherein said stretched film presents a variable gauge thickness.

12. A roll of stretched plastic film as claimed in claim 9 defined by a single layer web stretched along the length thereof.

* * * * *